(12) United States Patent
Tachiiri

(10) Patent No.: US 10,013,080 B2
(45) Date of Patent: Jul. 3, 2018

(54) MANIPULATION APPARATUS

(71) Applicant: DENSO CORPORATION, Kariya, Aichi-pref. (JP)

(72) Inventor: Motoki Tachiiri, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 116 days.

(21) Appl. No.: 14/912,934

(22) PCT Filed: Jul. 30, 2014

(86) PCT No.: PCT/JP2014/003996
§ 371 (c)(1),
(2) Date: Feb. 19, 2016

(87) PCT Pub. No.: WO2015/029335
PCT Pub. Date: Mar. 5, 2015

(65) Prior Publication Data
US 2016/0195937 A1    Jul. 7, 2016

(30) Foreign Application Priority Data

Aug. 27, 2013  (JP) ................................. 2013-175632

(51) Int. Cl.
*G06F 3/0338* (2013.01)
*G06F 3/0354* (2013.01)
(Continued)

(52) U.S. Cl.
CPC ............. *G06F 3/0338* (2013.01); *G05G 1/10* (2013.01); *G05G 5/03* (2013.01); *G05G 9/047* (2013.01);
(Continued)

(58) Field of Classification Search
CPC ...... G06F 3/016; G06F 3/0362; G06F 3/0338; G06F 3/033; G06F 3/03548; G06F 1/169;
(Continued)

(56) References Cited

U.S. PATENT DOCUMENTS 6,125,385 A *  9/2000  Wies ....................... G06F 3/016
                                              345/163
6,219,032 B1 *  4/2001  Rosenberg .............. A63F 13/06
                                              345/157

(Continued)

FOREIGN PATENT DOCUMENTS

EP       2192469 A2    6/2010
JP       2572689 Y2    5/1998
(Continued)

OTHER PUBLICATIONS

U.S. Appl. No. 14/784,428, filed Oct. 14, 2015, Hisatsugu.

(Continued)

*Primary Examiner* — Dismery Mercedes
(74) *Attorney, Agent, or Firm* — Harness, Dickey & Pierce, P.L.C.

(57) ABSTRACT

A manipulation apparatus that generates a manipulation reaction force on a manipulation knob by energizing a coil disposed between a coil-side yoke and a magnet. A permanent magnet is disposed on a contact portion for a housing of a knob base on which the manipulation knob is mounted. An electromagnet is disposed on a support portion of the housing that supports the contact portion. The electromagnet is energized to generate a repulsive force between the support portion and the contact portion. This reduces a friction force exerted between the support portion and the contact portion.

9 Claims, 9 Drawing Sheets

(51) Int. Cl.
  *G06F 3/01* (2006.01)
  *G05G 5/03* (2008.04)
  *G05G 9/047* (2006.01)
  *G06F 3/033* (2013.01)
  *G06F 3/038* (2013.01)
  *G05G 1/10* (2006.01)

(52) U.S. Cl.
  CPC .............. *G06F 3/016* (2013.01); *G06F 3/033* (2013.01); *G06F 3/0383* (2013.01); *G06F 3/03548* (2013.01); *G06F 2203/015* (2013.01)

(58) Field of Classification Search
  CPC .............. G06F 3/03543; G06F 3/0383; G06F 2203/014; G06F 2203/015; G05G 1/10; G05G 1/03; G05G 9/047; G05G 2009/04766; G05G 5/03
  See application file for complete search history.

(56) References Cited

U.S. PATENT DOCUMENTS

| | | | | |
|---|---|---|---|---|
| 6,750,877 | B2* | 6/2004 | Rosenberg | G05G 9/047 345/157 |
| 7,031,592 | B2* | 4/2006 | Akieda | G06F 3/0354 345/156 |
| 8,302,022 | B2* | 10/2012 | Tauchi | G06F 3/0482 345/156 |
| 8,704,776 | B2* | 4/2014 | Kim | G06F 3/016 345/156 |
| 9,564,279 | B2* | 2/2017 | Naka | H01H 50/42 |
| 2002/0198633 | A1* | 12/2002 | Weimper | G01C 21/3614 701/1 |
| 2004/0056745 | A1* | 3/2004 | Watanabe | G06F 3/016 335/220 |
| 2004/0059245 | A1 | 3/2004 | Watanabe et al. | |
| 2004/0135770 | A1* | 7/2004 | Hayasaka | G01C 21/3664 345/156 |
| 2004/0155863 | A1 | 8/2004 | Sakamaki et al. | |
| 2004/0164963 | A1* | 8/2004 | Ono | G06F 3/03549 345/167 |
| 2005/0099387 | A1 | 5/2005 | Matsumoto et al. | |
| 2005/0168077 | A1* | 8/2005 | Akieda | H02K 41/03 310/12.05 |
| 2007/0152988 | A1* | 7/2007 | Levin | G06F 3/016 345/184 |
| 2008/0180267 | A1 | 7/2008 | Kaneko et al. | |
| 2010/0005412 | A1* | 1/2010 | Tauchi | G06F 3/0482 715/771 |
| 2011/0006989 | A1 | 1/2011 | Ji | |
| 2011/0140818 | A1* | 6/2011 | Hatanaka | G05G 5/05 335/219 |
| 2011/0316724 | A1* | 12/2011 | Morieda | G06F 3/016 341/20 |
| 2013/0229339 | A1* | 9/2013 | Takahata | G06F 3/016 345/156 |

FOREIGN PATENT DOCUMENTS

| | | |
|---|---|---|
| JP | 2003086064 A | 3/2003 |
| JP | 2004112979 A | 4/2004 |
| JP | 2004192634 A | 7/2004 |
| JP | 2005141675 A | 6/2005 |
| JP | 2005223958 A | 8/2005 |
| JP | 2006268154 A | 10/2006 |
| JP | 2008108062 A | 5/2008 |
| JP | 2008180652 A | 8/2008 |
| JP | 2011513852 A | 4/2011 |
| JP | 2011164720 A | 8/2011 |

OTHER PUBLICATIONS

U.S. Appl. No. 14/787,479, filed Oct. 28, 2015, Tachiiri.
International Search Report and Written Opinion (in Japanese with English Translation) for PCT/JP2014/003996, dated Oct. 21, 2014; ISA/JP.

* cited by examiner

MANIPULATION APPARATUS

CROSS REFERENCE TO RELATED APPLICATIONS

This application is a U.S. National Phase Application under 35 U.S.C. 371 of International Application No. PCT/JP2014/003996 filed on Jul. 30, 2014 and published in Japanese as WO 2015/029335 A1 on Mar. 5, 2015. This application is based on and claims the benefit of priority from Japanese Patent Application No. 2013-175632 filed on Aug. 27, 2013. The entire disclosures of all of the above applications are incorporated herein by reference.

TECHNICAL FIELD

The present disclosure relates to a manipulation apparatus to which a manipulation force is inputted.

BACKGROUND ART

A manipulation apparatus disclosed in Patent Literature 1 presents a tactile sense to a finger of a manipulating person, e.g., manipulating a tactile sense presentation member as a manipulation portion receiving a manipulation force; the tactile sense is presented using the force applied by an actuator. The actuator includes a magnet and a coil. The magnet is retained on a first yoke plate. The coil is retained by a coil retention member that is capable of moving together with the tactile sense presentation member. Magnetic field lines generated by the magnet are directed to the coil by a second yoke plate that is disposed opposite the magnet and the first yoke plate with respect to the coil. An electromagnetic force (a Lorentz force), which is generated when the coil is energized, is then exerted on the tactile sense presentation member.

PRIOR ART LITERATURES

Patent Literature

Patent Literature 1: JP 2004-112979 A (JP 3997872 B2)

SUMMARY OF INVENTION

The manipulation apparatus in Patent Literature 1 immovably retains the magnet and movably retains the coil. In contrast, the inventors of the present disclosure have studied a manipulation apparatus that immovably retains a coil by a retaining body and retains a magnet by a movable body.

In such manipulation apparatus, the magnet is movably retained together with the movable body, and a yoke plate disposed opposite the magnet with respect to the coil is immovably retained together with the coil by the retaining body. Thus, a magnetic attraction force exerted between the yoke plate and the magnet acts on both the retaining body and the movable body. This causes the magnetic attraction force to press the movable body against the retaining body; friction force generated between the movable body and the retaining body increases when the movable body relatively moves in contact with the retaining body. Resultant sliding resistance due to the friction force disturbs manipulation of the manipulation portion on the movable body.

In view of the above circumstances, the present disclosure has been made to provide a manipulation apparatus in which a coil is retained by a retaining body, a magnet is retained by a movable body that is capable of moving together with a manipulation portion, and the coil is energized to generate a Lorentz force and exert the Lorentz force on the manipulation portion. An object of the present disclosure is to facilitate the manipulation of the manipulation portion.

According to one example of the present disclosure, there is provided a manipulation apparatus that includes a movable body capable of moving while retaining a magnet together with a manipulation portion to which a manipulation force is inputted. A retaining body retains a coil and a yoke. The coil is spaced from a movement path of the magnet that is moved by the movement of the movable body. The yoke is disposed opposite the magnet with respect to the coil and used to direct magnetic field lines generated by the magnet to the coil. The retaining body is brought into contact with the movable body from the side of the coil and of the yoke in order to support the movable body.

Thus, a Lorentz force generated by energizing the coil can be exerted on the manipulation portion. In this instance, between the magnet and the yoke, a magnetic attraction force acts on both the movable body and the retaining body. In the resulting state, a great friction force is exerted on a contact portion between the retaining body and the movable body as mentioned earlier. In the present example, therefore, a repulsive force generation portion generates a repulsive force between the movable body and the retaining body. This reduces the contact pressure between the retaining body and the movable body, thereby reducing the friction force as well. The ease of manipulation of the manipulation portion can be thereby increased.

The repulsive force generation portion may adopt various configurations. The repulsive force generation portion may be a magnet that is provided for each of the movable body and the retaining body. In such an instance, at least either the magnet for the movable body or the magnet for the retaining body may be an electromagnet. Such a configuration can adjust the magnitude of the repulsive force by controlling the energization of the electromagnet. Hence, sliding resistance exerted on the movable body can also be adjusted to an appropriate value. This increases the ease of manipulation of the manipulation portion.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

[Overall Configuration of Embodiment]

Figure 1:
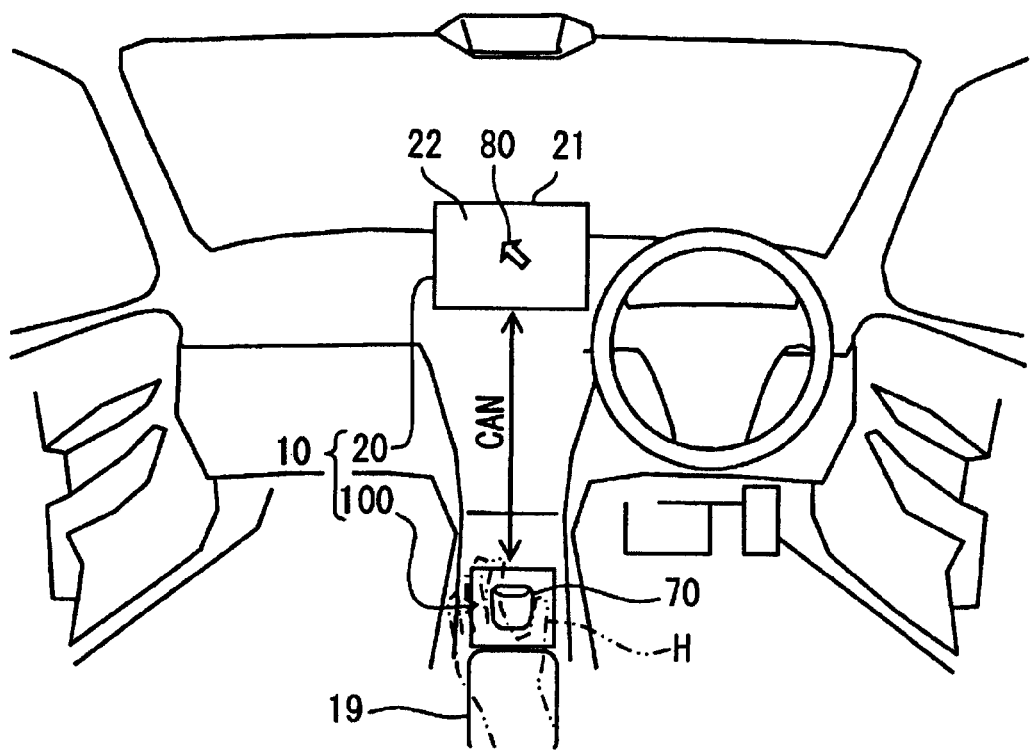
FIG. 1 is a diagram illustrating a layout of a manipulation apparatus in a vehicle compartment according to an embodiment of the present disclosure.

An embodiment of the present disclosure will now be described with reference to the accompanying drawings. A manipulation apparatus 100 according to the present embodiment is mounted in a vehicle to form a display system 10 together with, for example, a navigation apparatus 20 as in FIG. 1. The manipulation apparatus 100 is mounted on a center console of the vehicle and positioned adjacent to an armrest 19 in such a manner that a manipulation knob 70 is exposed and positioned within easy reach of a hand H of a manipulating person. When a manipulation force is inputted to the manipulation knob 70, for example, by the hand of the manipulating person, the manipulation knob 70 is displaced in the direction of the inputted manipulation force. The navigation apparatus 20 includes a display 21 that is mounted on an instrument panel of the vehicle. A display screen 22 of the display 21 is exposed and oriented toward a driver seat. The display screen 22 shows, for example, a plurality of buttons (so-called icons) and a cursor 80. The buttons are assigned predetermined functions. The cursor 80 is used to select a desired button (shaped like a so-called mouse pointer in the present embodiment). When a horizontally-oriented manipulation force is inputted to the manipulation knob 70, the cursor 80 moves over the display screen 22 in a direction corresponding to the input direction of the manipulation force.

Figure 2:
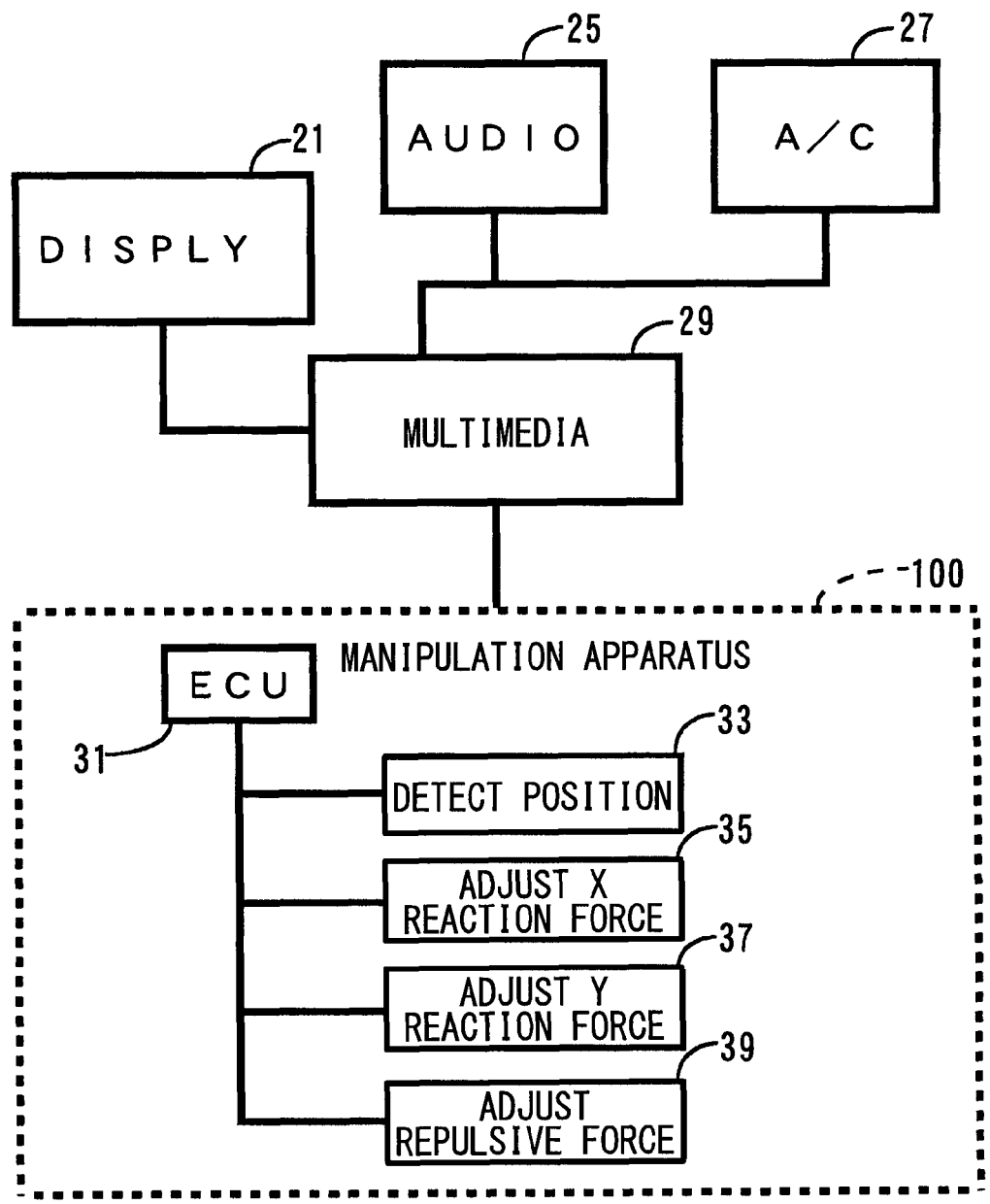
FIG. 2 is a block diagram illustrating a configuration of a control system including the manipulation apparatus.

As in FIG. 2, the display 21 together with an audio unit 25, an air conditioner (A/C) 27, etc. is connected to the manipulation apparatus 100 through a multimedia device 29. The connection between the display 21, the air conditioner 27, and the multimedia device 29 uses CAN communication based on a CAN (Controller Area Network). The connection between the audio unit 25 and the multimedia device 29 uses MOST (Media Oriented Systems Transport) communication. The multimedia device 29 transmits a drawing command to the display 21. The multimedia device 29 also transmits various control signals to the audio unit 25 and the air conditioner 27. Further, the multimedia device 29 transmits drawing information on drawing displayed on the display 21 to the manipulation apparatus 100. The manipulation apparatus 100 transmits cursor position information corresponding to the position of the manipulation knob 70 to the multimedia device 29.

The manipulation apparatus 100 is electrically formed of an ECU 31, a position sensor 33, an X reaction force adjustment portion 35, a Y reaction force adjustment portion 37, and a repulsive force adjustment portion 39, for example. Electrical power required for operating these components is supplied from a battery unshown. The position sensor 33 detects the position of the manipulation knob 70. Based on the position of the manipulation knob 70 and the drawing information, the ECU 31 controls the X reaction force adjustment portion 35, the Y reaction force adjustment portion 37, and the repulsive force adjustment portion 39, for instance. Although a detailed mechanism description will be given later, the X reaction force adjustment portion 35 adjusts an x-axis direction (left-right direction) reaction force applied to the manipulation knob 70. The Y reaction force adjustment portion 37 adjusts a y-axis direction (front-rear direction) reaction force applied to the manipulation knob 70. The repulsive force adjustment portion 39 adjusts a repulsive force exerted between a knob base 71 on which the manipulation knob 70 is mounted and a housing 50 (see FIG. 3) of the manipulation apparatus 100 that supports the knob base 71.

[Detailed Configuration and Operation of Manipulation Apparatus]

A configuration of the manipulation apparatus will now be described in detail. For the sake of convenience, the following description will be given on the assumption that the manipulation knob 70 is oriented upward, and that the x-axis direction in which the manipulation knob 70 is movable is the left-right direction, and further that the y-axis direction in which the manipulation knob 70 is movable is the front-rear direction. However, the manipulation apparatus 100 is not limited to the above layout.

Figure 3:
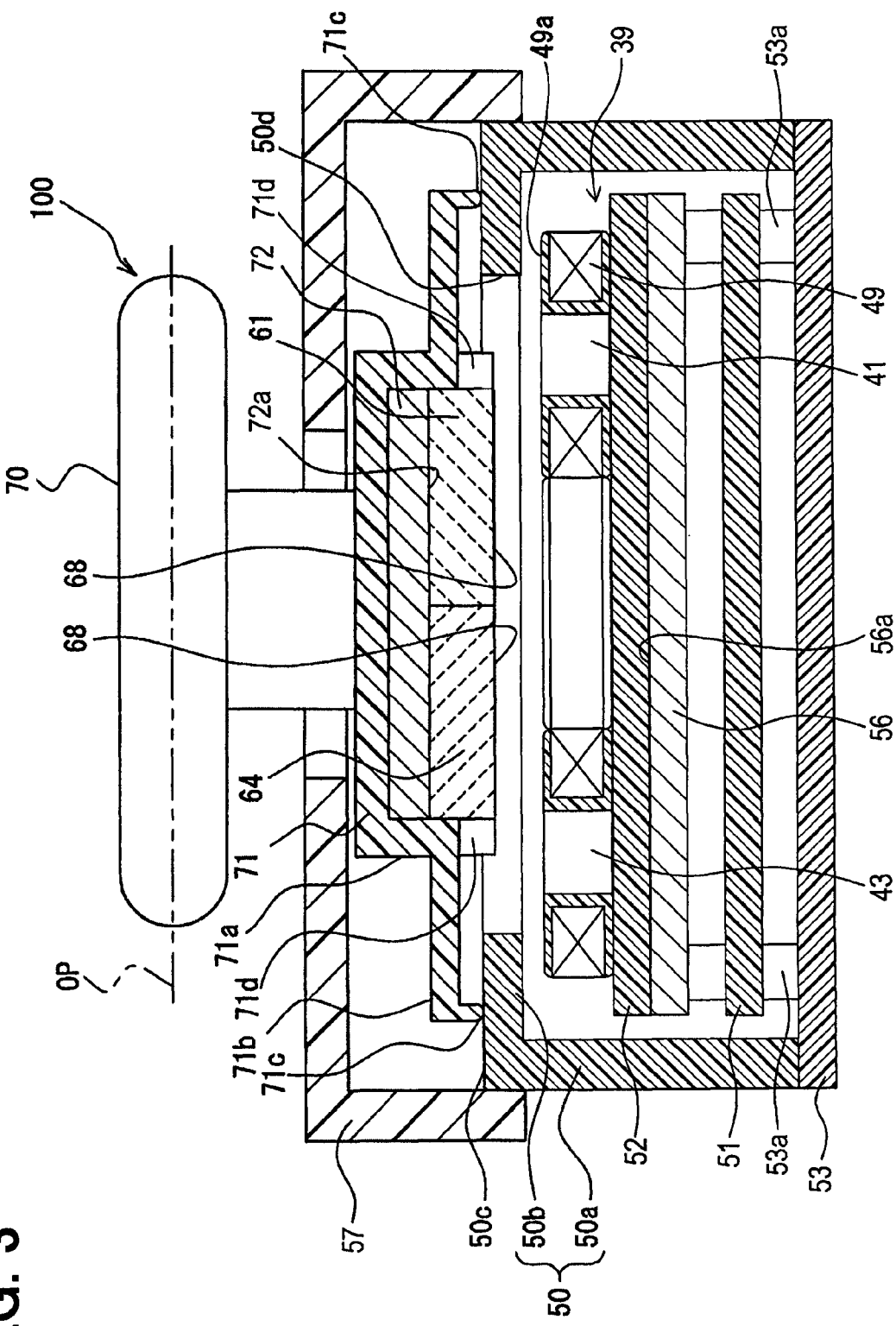
FIG. 3 is a cross-sectional view illustrating a configuration of the manipulation apparatus.

As in FIG. 3, the manipulation apparatus 100 is mechanically formed of the manipulation knob 70 and the housing 50, etc. The manipulation knob 70 is disposed so as to be relatively movable in the x- and y-axis directions on a virtual manipulation plane OP with respect to the housing 50. The x- and y-axis direction movement ranges of the manipulation knob 70 are predefined by the housing 50.

The housing 50 supports the manipulation knob 70 so as to permit its relative movement, and accommodates components such as circuit boards 51, 52. The circuit boards 51, 52 are secured to the inside of the housing with by a stud 53a that is extended from a bottom cover 53 fastened to the underside of the housing 50. The circuit boards 51, 52 are parallelly positioned on top of the other in such a manner that their board surfaces are oriented along the manipulation plane OP. A control circuit mainly formed of a microcomputer such as the ECU 31 is mounted on the lower circuit board 51.

Figure 4:
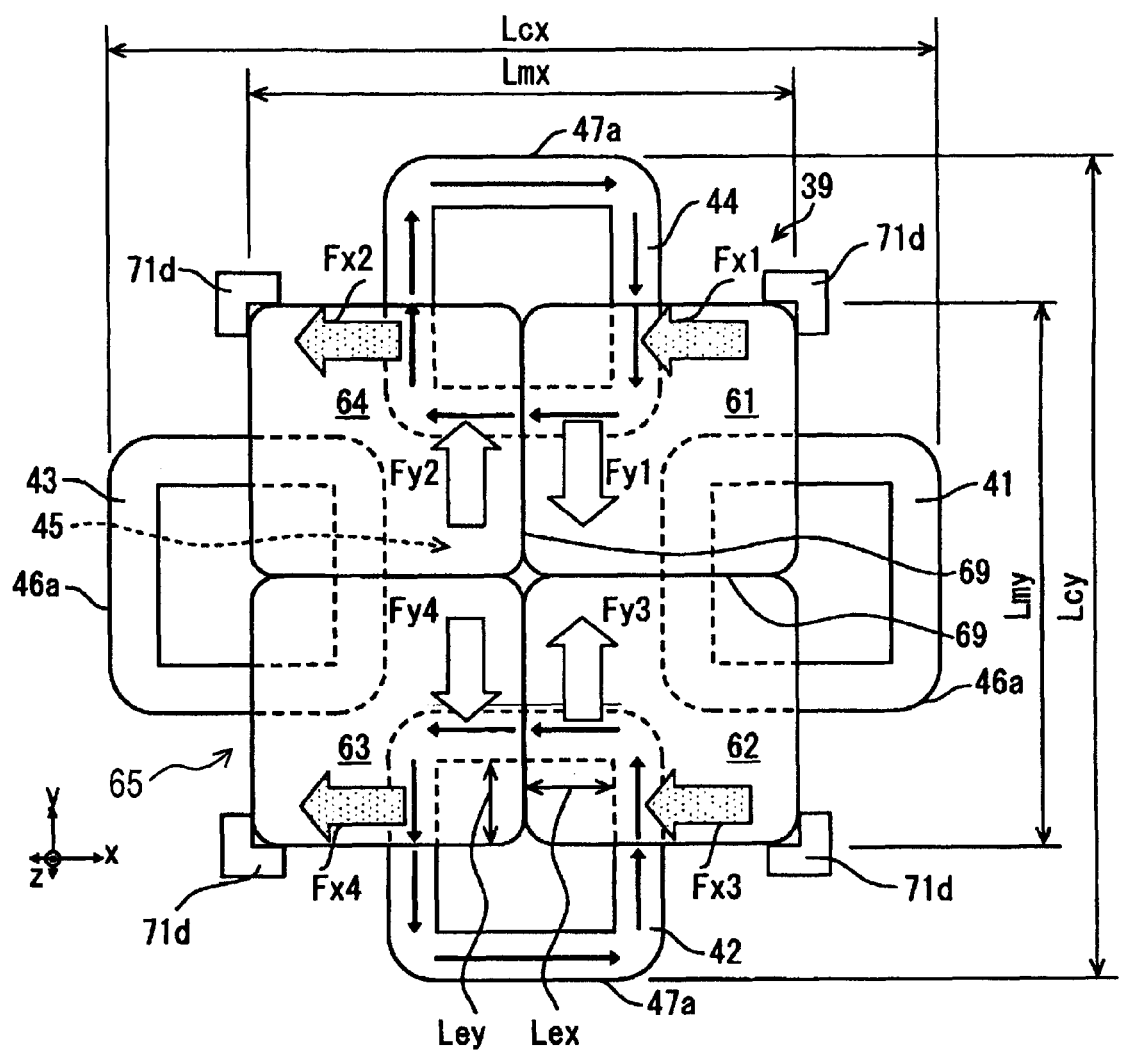
FIG. 4 is a schematic diagram illustrating a z-direction view of a reaction force generation mechanism in the manipulation apparatus.

As in FIGS. 3 and 4, four coils 41-44 are accurately positioned on the upper circuit board 52. The manipulation knob 70 is provided with four magnets 61-64 that are movable together with the manipulation knob 70. The coils 41-44 are each formed by winding a winding wire 49 made of a nonmagnetic material, such as copper, around a bobbin 49a. Current applied to each winding wire 49 is individually controlled by the X reaction force adjustment portion 35 or the Y reaction force adjustment portion 37.

Each coil 41-44 is mounted on the circuit board 52 in such a manner that the winding axis direction of the winding wire 49 is oriented along a z-axis, which is orthogonal to the manipulation plane OP. Each coil 41-44 is retained by the circuit board 52 in such a manner that the winding wire 49 is extended in the x- and y-axis directions to substantially form a square when viewed in the z-axis direction.

The four coils 41-44 are arranged in a cross-shaped pattern. More specifically, as in FIG. 4, a pair of coils 41, 43 are arranged in the x-axis direction and spaced from each other while a pair of coils 42, 44 are arranged in the y-axis direction and spaced from each other. This arrangement forms a central region 45 that is surrounded on all four sides by the four coils 41-44.

The magnets 61-64 are each formed of a neodymium magnet and shaped like a plate. Each magnet 61-64 is shaped like a quadrilateral whose sides 69 (see FIG. 4) are equal in length. In the present embodiment, each magnet 61-64 is substantially shaped like a square. The magnets 61-64 are retained by the knob base 71 while their sides 69 are oriented along either the x-axis or the y-axis.

The four magnets 61-64 are disposed so that two of them are arranged in the x-axis direction while the other two are arranged in the y-axis direction. In other words, the four magnets 61-64 are respectively positioned in the first to fourth quadrants. The four magnets 61-64 each include a facing surface 68 (see FIG. 3) that faces the circuit board 52 while they are retained by the knob base 71. Each of the facing surfaces 68 of the four magnets 61-64 is substantially shaped like a square and a smooth flat surface. The facing surfaces 68 are each oriented to face two of the four coils 41-44 in the z-axis direction through an opening 50d formed in the housing 50.

The magnets 61-64 are each magnetized in the z-axis direction. The facing surface 68 of one magnet differs in polarity from the opposite surface. The polarities of the facing surfaces 68 of the magnets 61-64, i.e., two magnetic poles of the N-pole and the S-pole, are disposed so that the polarities of neighboring magnets arranged in the x- or y-axis direction differ from each other.

The manipulation apparatus 100 includes a coil-side yoke 56 and a magnet-side yoke 72. The coil-side yoke 56 and the magnet-side yoke 72 direct magnetic field lines generated by the magnets 61-64 to the coils 41-44, which face the magnets 61-64 in the z-axis direction. The magnet-side yoke 72 and the coil-side yoke 56 are formed of magnetic material and shaped like a rectangular plate. More specifically, the yokes 72, 56 are shaped like a flat plate having no surface irregularities of convex and concave. The magnet-side yoke 72 is disposed to be closer to the manipulation knob 70 than the magnets 61-64 are. The coil-side yoke 56 is disposed to be farther from the manipulation knob 70 than the coils 41-44 are. In short, the magnets 61-64 and the coils 41-44 are positioned between the yokes 72, 56.

The magnet-side yoke 72 and the coil-side yoke 56 form a part of a magnetic circuit that serves as a path for the magnetic field lines generated by the magnets 61-64. This reduces the magnetic field line leakage to the outside of the magnetic circuit. In other words, the coils 41-44 are disposed in a position in which the magnetic field lines between the yokes 72, 56 pass. This ensures that the magnetic field lines are concentrated on the coils 41-44.

Suppose that a one-piece item including the four magnets 61-64 is called a magnet assembly 65 (see FIG. 4). The sizes of facing surfaces 56a, 72a, which are the surfaces of the coil-side yoke 56 and the magnet-side yoke 72 that face each other, are set so that the magnet assembly 65 does not protrude from the facing surfaces 56a, 72a when viewed in the z-axis direction. In other words, the length of each side of the facing surfaces 56a, 72a shaped like a rectangle is set to be not less than the length Lmx, Lmy (see FIG. 4) between the outer edges of the magnet assembly 65. In the example of FIG. 3, the length of each side of the facing surface 72a is the same as the length Lmx, Lmy between the outer edges of the magnet assembly 65.

The housing 50 includes a main body portion 50a and a support portion 50b. The main body portion 50a houses the four coils 41-44, the coil-side yoke 56, and the circuit boards 51, 52. The support portion 50b supports the knob base 71. The main body portion 50a is shaped like a cylinder that is extended in the z-axis direction. The support portion 50b is shaped like a plate that is extended from a cylinder end of the main body portion 50a, which is positioned toward the manipulation knob 70, to the inside of the cylinder. The main body portion 50a and the support portion 50b are integrally formed of resin.

The circuit board 52 is secured to the main body portion 50a through the bottom cover 53 attached to a cylinder end of the main body portion 50a that is positioned opposite the manipulation knob 70. The coils 41-44 are mounted on the circuit board 52. The coil-side yoke 56 is mounted on a surface of the circuit board 52 that is opposite the surface on which the coils 41-44 are mounted. In other words, the coils 41-44 and the coil-side yoke 56 are retained by the main body portion 50a through the circuit board 52 and the bottom cover 53. In short, the housing 50, the circuit board 52, and the bottom cover 53 function as a "retaining body" that retains the coils 41-44 and the coil-side yoke 56.

A cover 57, which is installed over the knob base 71, is attached to the cylinder end of the main body portion 50a that is positioned adjacent to the manipulation knob 70. Thus, the housing 50, the bottom cover 53, the cover 57, and the circuit boards 51, 52 are secured in a nondisplaceable manner to predetermined portions of the instrument panel.

Meanwhile, the knob base 71 is secured to the housing 50 in such a manner that the knob base 71 is movable inside the cover 57. The knob base 71 retains the four magnets 61-64 and the magnet-side yoke 72. Further, the manipulation knob 70 is attached to the knob base 71. Therefore, when a manipulation force is inputted to the manipulation knob 70, the knob base 71, the magnets 61-64, and the magnet-side yoke 72 move together with the manipulation knob 70. In other words, the knob base 71 functions as a "movable body" that relatively moves in contact with the housing 50 with respect to the housing 50 while retaining the magnets 61-64, for example. The manipulation knob 70 functions as a "manipulation portion" to which the manipulation force of the manipulating person is inputted.

The knob base 71 includes a retaining portion 71a, an extended portion 71b, a contact portion 71c, and a bracket 71d, which are described below. The retaining portion 71a is shaped like a cylinder in which the magnet-side yoke 72 and the magnets 61-64 are retained. The extended portion 71b is shaped like a plate that is extended in parallel with the manipulation plane OP from a cylinder end (lower end) of the retaining portion 71a. The contact portion 71c is shaped like a pin that projects from an extension end of the extended portion 71b toward the housing 50. The contact portion 71c is formed on three or more portions of the extended portion 71b. In the example of FIG. 3, the contact portion 71c is formed at each of the four corners of the extended portion 71b, which is rectangular in shape.

The support portion 50b of the housing 50 forms a slide contact surface 50c. The slide contact surface 50c is extended in parallel with the manipulation plane OP. A plurality of the contact portions 71c come into contact with the slide contact surface 50c. Such a contact causes the housing 50 to support the knob base 71 such that the knob base 71 is positioned to be adjacent to the coils 41-44 and the coil-side yoke 56 in such a manner as to permit the knob case 71 to move in the direction of the manipulation plane OP.

Figure 5:
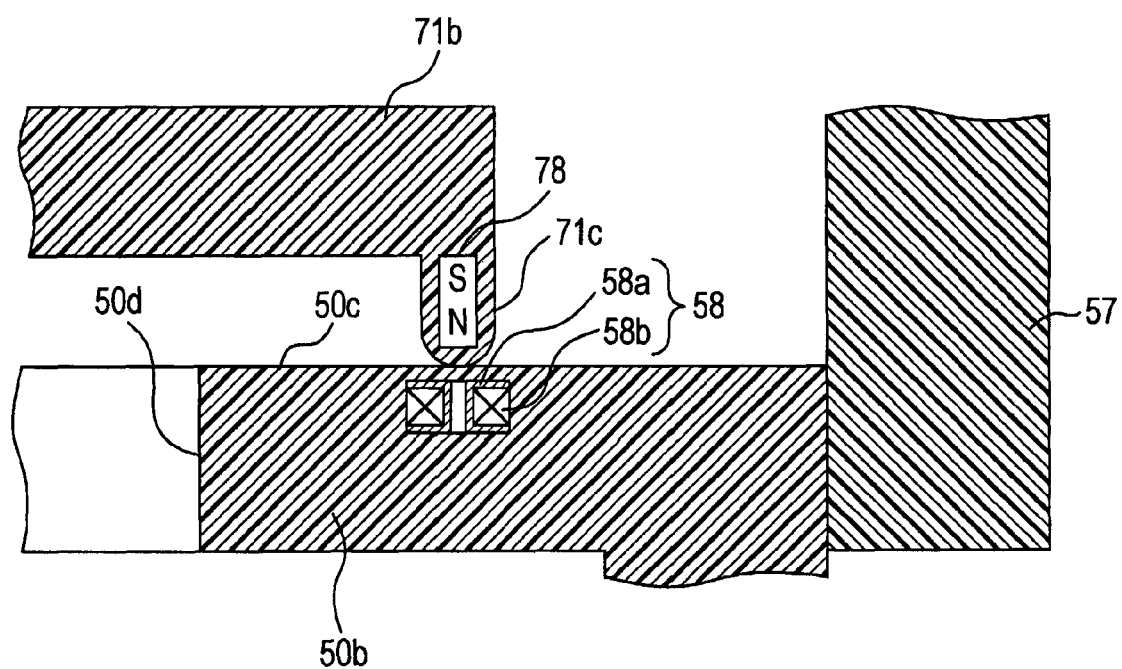
FIG. 5 is a schematic diagram illustrating an enlarged view of a repulsive force generation mechanism in the manipulation apparatus.

The bracket 71d is shaped so that it is extended in the z-axis direction along the outer edges of the magnet assembly 65. In the example of FIG. 4, the bracket 71d is disposed at each of the four corners of the magnet assembly 65. The retaining portion 71a, the extended portion 71b, and the contact portions 71c are integrally formed of resin. The bracket 71d is formed of nonmagnetic material such as resin and mounted on the extended portion 71b. As in FIG. 5, a permanent magnet 78 is disposed in each contact portion 71c. An electromagnet 58 is embedded in the support portion 50b of the housing 50 that faces the permanent magnet 78 in such a manner as not to impair the flatness of the slide contact surface 50c. Each permanent magnet 78 is magnetized in the z-axis direction. For the sake of convenience, N and S polarities are indicated in FIG. 5. However, the permanent magnet is not limited to such polarities. The electromagnet 58 is formed by winding a coil 58b around a bobbin 58a whose axis is oriented in the z-axis direction.

The repulsive force adjustment portion 39 (see FIG. 2) generates a repulsive force between the support portion 50b and the contact portion 71c when current is applied to the coil 58b in such a manner that the electromagnet 58 and the permanent magnet 78 repulsively interact with each other. Further, the repulsive force adjustment portion 39 adjusts the magnitude of the repulsive force by adjusting the magnitude of the current in compliance with a control signal from the ECU 31.

Operating principles of the X reaction force adjustment portion 35 and the Y reaction force adjustment portion 37 will now be described. First, suppose a case of generating a manipulation reaction force in the x-axis direction at a reference position at which the center of the magnet assembly 65 overlaps with the center of the central region 45 in the z-axis direction as in FIG. 4. In this case, the X reaction force adjustment portion 35 applies the following current to the coils 42, 44 arranged in the y-axis direction. Clockwise current is applied to the coil 44 when the coil-side yoke 56-to-magnet-side yoke 72 direction is viewed from above. In contrast, counterclockwise current is applied to the coil 42.

When the above currents flow, a Lorentz force (hereinafter referred to as an electromagnetic force) Fy1 oriented in a direction from the coil 44 to the coil 42 along the y-axis (hereinafter referred to as the "rearward direction") is generated in a portion of the winding wire 49 of the coil 44 that is extended in the x-axis direction and overlapped with the magnet 61 in the z-axis direction. Further, an electromagnetic force Fy2 oriented in a direction from the coil 42 to the coil 44 along the y-axis (hereinafter referred to as the "forward direction") is generated in a portion of the winding wire 49 of the coil 44 that is extended in the x-axis direction and overlapped with the magnet 64 in the z-axis direction. Similarly, an electromagnetic force Fy3 oriented in the rearward direction is generated in a portion of the winding wire 49 of the coil 42 that is extended in the x-axis direction and overlapped with the magnet 62 in the z-axis direction; an electromagnetic force Fy4 oriented in the forward direction is generated in a portion of the winding wire 49 of the coil 42 that is extended in the x-axis direction and overlapped with the magnet 63 in the z-axis direction. The electromagnetic forces Fy1, Fy3 oriented in the y-axis direction and the electromagnetic forces Fy2, Fy4 oriented in the y-axis direction counteract with each other.

Meanwhile, electromagnetic forces Fx1, Fx2 oriented in a direction from the coil 41 to the coil 43 along the x-axis (hereinafter referred to as the "leftward direction") are generated in a portion of the winding wire 49 of the coil 44 that is extended in the y-axis direction and overlapped with the magnets 61, 64 in the z-axis direction. Similarly, electromagnetic forces Fx3, Fx4 oriented in the leftward direction are generated in a portion of the winding wire 49 of the coil 42 that is extended in the y-axis direction and overlapped with the magnets 62, 63 in the z-axis direction. The X reaction force adjustment portion 35 is capable of applying the electromagnetic forces Fx1-Fx4 to the manipulation knob 70 as a manipulation reaction force in the x-axis direction.

When a manipulation reaction force in the y-axis direction is to be generated based on the same technical idea as above, the Y reaction force adjustment portion 37 may exercise current control in such a manner as to apply counterclockwise current to the coil 41 and apply clockwise current to the coil 43. Further, when the X reaction force adjustment portion 35 and the Y reaction force adjustment portion 37 control the magnitude of the current to be applied to the coils 41-44, the magnitude of the manipulation reaction force in each axis direction is adjusted. Besides, when the direction of the current to be applied to the coils 41-44 is changed, the direction of the manipulation reaction force exerted on the magnet assembly 65 changes.

In order to enable the X reaction force adjustment portion 35 and the Y reaction force adjustment portion 37 to generate a predetermined manipulation reaction force, each winding wire 49 needs to overlap with the magnet assembly 65 in the z-axis direction for at least a predefined length. More specifically, in order to generate predetermined x-axis direction electromagnetic forces Fx1-Fx4, a portion of each winding wire 49 of each coil 42, 44 that is extended in the y-axis direction needs to overlap with the magnet assembly 65 for at least a predefined length. Therefore, in a state where the magnet assembly 65 is in a reference position, the length of a range overlapping with the magnet assembly 65 (hereinafter referred to as the "y-axis direction effective length") Ley is predefined for a portion of each winding wire 49 that is extended in the y-axis direction. Similarly, the x-axis direction effective length Lex is predefined in order to generate predetermined y-axis direction electromagnetic forces Fy1-Fy4.

The x- and y-axis direction effective lengths Lex, Ley can be maintained even when the manipulation knob 70 is moved to move the magnet assembly 65 away from the reference position. A configuration for maintaining the effective lengths Lex, Ley will now be described.

In the magnet assembly 65, the sides 69 neighboring each other at the paralleled facing surfaces 68 are in contact with each other without being spaced apart from each other. In the magnet assembly 65, the x-axis direction length Lmx between the outer edges is smaller than the length Lcx between the outer edges of a pair of coils 41, 43 arranged in the x-axis direction. Besides, the y-axis direction length Lmy between the outer edges is smaller than the length Lcy between the outer edges of a pair of coils 42, 44 arranged in the y-axis direction. This configuration ensures that the magnet assembly 65 is retained by the manipulation knob 70 and able to move within a range surrounded by the outer edges 46a, 47a of the four coils 41-44.

Figure 6:
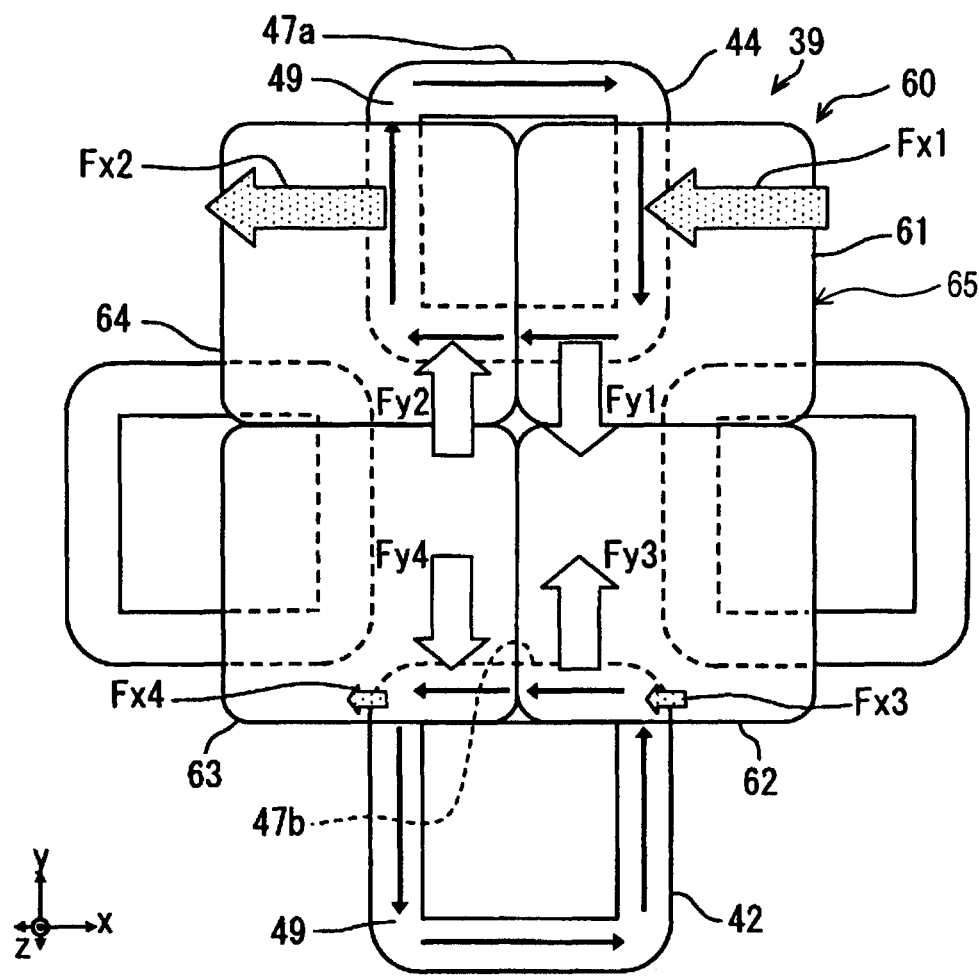
FIG. 6 is a schematic diagram illustrating electromagnetic force changes occurring when a magnet assembly is moved forward in the manipulation apparatus.

As in FIG. 6, when the magnet assembly 65 moves forward, the overlap between the facing surfaces 68 of the magnets 62, 63 positioned rearward in direction of movement and the coil 42 positioned rearward in the direction of movement decreases. Hence, the y-axis direction effective length Ley of the coil 42 decreases. However, the overlap between the facing surfaces 68 of the magnets 64, 61 positioned forward in direction of movement and the coil 44 positioned forward in the direction of movement increases. Hence, the y-axis direction effective length Ley of the coil 44 increases. As described above, the sum of the y-axis direction effective lengths Ley of the coils 42, 44 is maintained even when the magnet assembly 65 moves in the y-axis direction. Therefore, generable x-axis direction electromagnetic forces Fx1-Fx4 can be maintained.

In the above-described present embodiment, the magnet assembly 65 secured to the knob base 71 relatively moves with respect to the coils 41-44 secured to the housing 50. If the coils 41-44 are secured to the knob base 71 with the magnet assembly 65 secured to the housing 50 without regard to the configuration of the present embodiment, the following occurs. The magnet assembly 65 needs to be disposed to cover the entire range of movement of the coils 41-44, necessarily increasing the area of the magnet assembly 65 in the x- and y-axis directions. The size of the manipulation apparatus 100 thereby increases. In contrast, the present embodiment is structured to move the magnet assembly 65. Consequently, the present embodiment decreases the size of the magnet assembly 65.

Besides, as mentioned earlier, the present embodiment is configured so that the effective lengths Lex, Ley is maintained no matter where the magnet assembly 65 moves. Therefore, while the employed structure allows the magnet assembly 65 to move, the strength of the generable electromagnetic forces Fy1-Fy4, Fx1-Fx4 can be maintained no matter whether the magnet assembly 65 moves. This reduces the size of the individual magnets 61-64 and implements the manipulation apparatus 100 capable of providing generable electromagnetic forces.

Further, if the employed structure permits the coils 41-44 to move without regard to the configuration of the present embodiment as mentioned earlier, the wiring connecting the coils 41-44 to the circuit board 52 is subjected to bending deformation each time the coils 41-44 move. As a result, the durability of the wiring is at risk. In contrast, the present embodiment is structured so as to move the magnet assembly 65, which requires no wiring. Therefore, the present embodiment does not subject the wiring to bending deformation when the coils 41-44 move. Consequently, the durability of the wiring is not at risk in the present embodiment.

Moreover, the present embodiment is structured to not only move the magnet assembly 65 but also generate a repulsive force between the support portion 50b and the contact portion 71c through the repulsive force adjustment portion 39. Therefore, the present embodiment inhibits the magnetic attraction force generated between the coil-side yoke 56 and the magnets 61-64 from providing sliding resistance to the manipulation knob 70. In other words, the magnetic attraction force generates a repulsive force between the contact portion 71c and the slide contact surface 50c to prevent the contact portion 71c from being pressed against the slide contact surface 50c. Hence, the present embodiment avoids an increase in friction force generated between the slide contact surface 50c and the contact portion 71c when the contact portion 71c relatively moves in contact with the slide contact surface 50c. This can avoid a feeling of discomfort during the manipulation of the manipulation knob 70 and provide an improved manipulation feeling.

[Control Provided by Present Embodiment]

Figure 7:
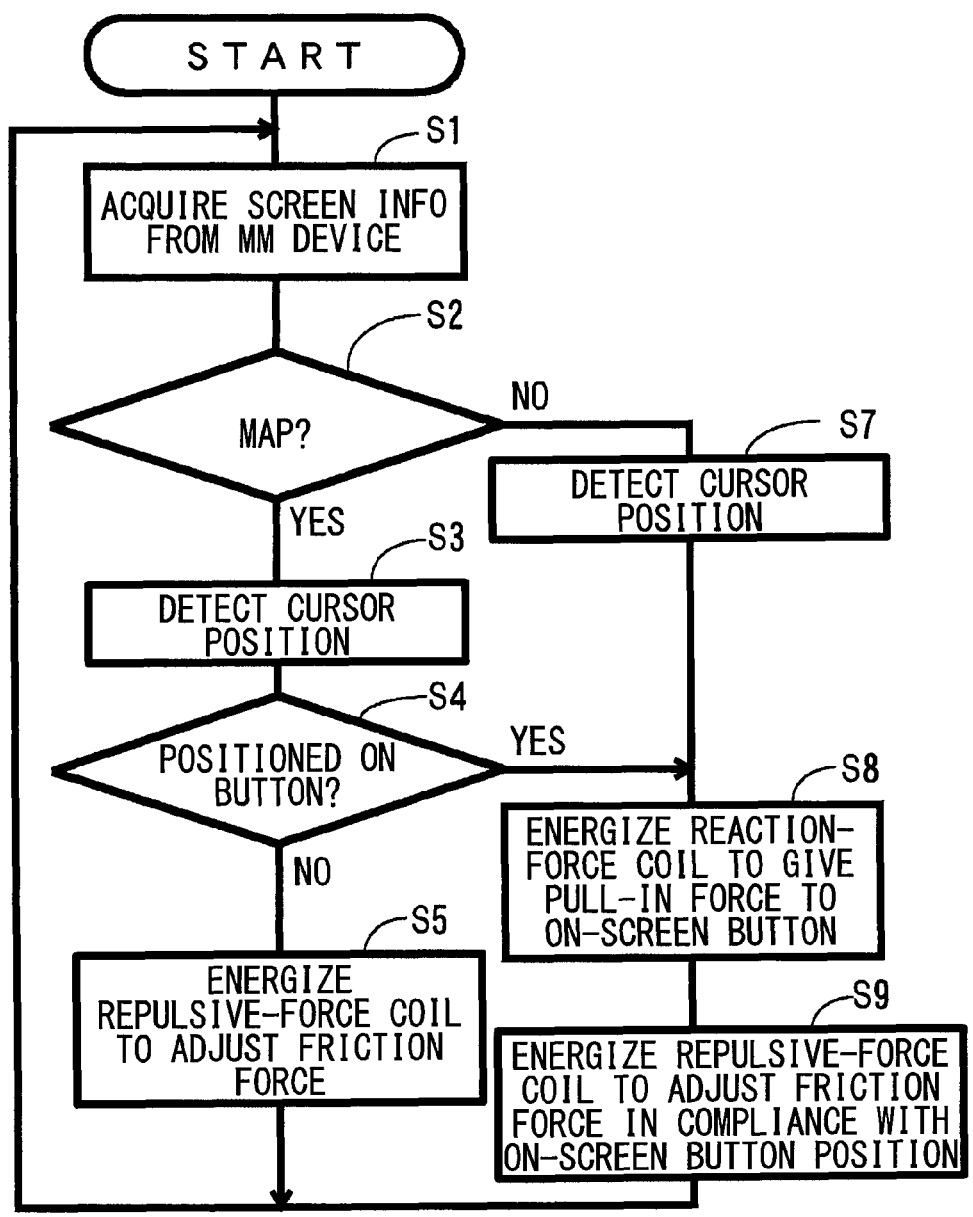
FIG. 7 is a flowchart illustrating a control process that is performed on the reaction force and on the repulsive force.

The present embodiment further increases the ease of manipulation of the manipulation apparatus 100 by causing the ECU 31 to perform a process described below. The flowchart of FIG. 7 illustrates the process that is repeatedly performed by the ECU 31 while something is displayed on the display screen 22.

As in FIG. 7, first, in S1 (the letter "S" hereinafter stands for "step") of the process, screen-view information about an image displayed on the display screen 22 of the display 21 is acquired through the multimedia device 29. Next, in S2, a check is performed to determine whether a map screen-view is displayed. If the map screen-view is displayed (S2: Y), processing proceeds to S3.

In S3, the position of the manipulation knob 70 is detected through the position sensor 33 to detect the position of the cursor 80 on the display screen 22. Next, in S4, the screen-view information is compared against the cursor position to determine whether the cursor 80 is positioned over a button. If the cursor 80 is not positioned over a button (S4: N), processing proceeds to S5. In S5, current is applied to the coil 58b, which is used to adjust the repulsive force, in order to provide appropriate sliding resistance during the manipulation of the manipulation knob 70, that is, provide appropriate friction force between the support portion 50b and the contact portion 71c. The processing then proceeds to S1.

Figure 8:
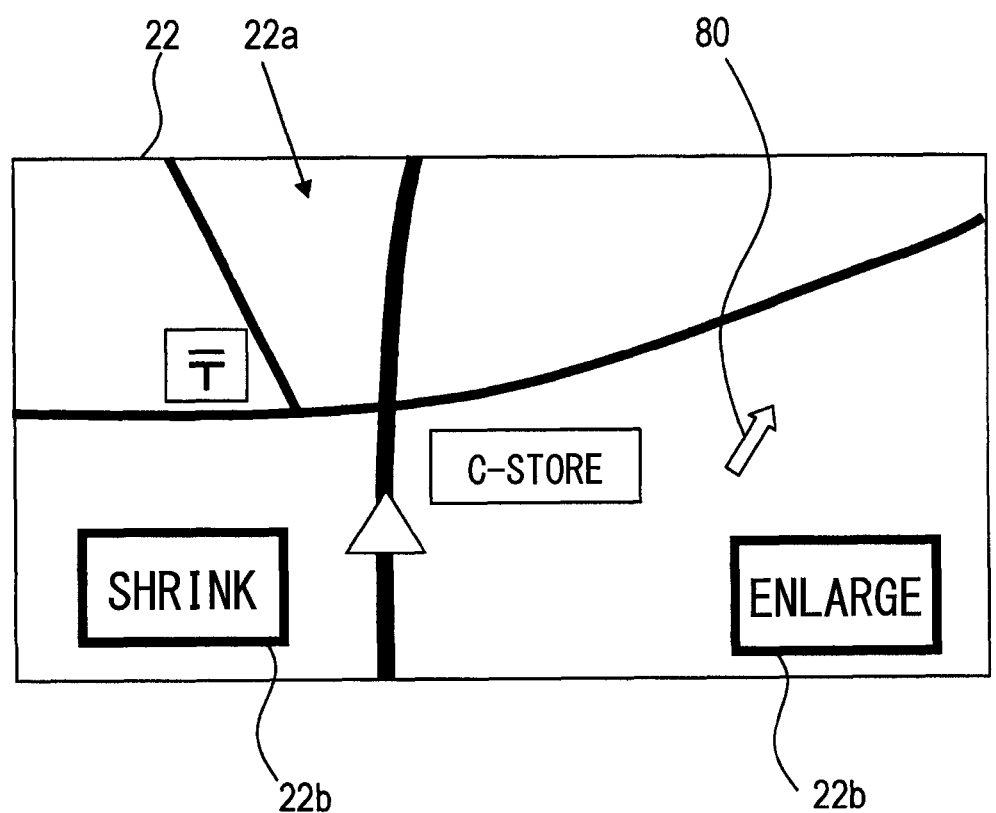
FIG. 8 is a diagram illustrating an example of a screen-view used in the control process.

If the display screen 22 displays a map screen-view for car navigation, the display screen 22 shows a map 22a and various buttons 22b as in FIG. 8. The various buttons 22b are used to enter various commands including those for enlarging or shrinking the map 22a. The cursor 80 moves in response to the manipulation of the manipulation knob 70 for the purpose of designating a destination on the map 22a or press a button 22b.

When the cursor 80 is moved over the map 22a (S4: N), the manipulation knob 70 should encounter a certain amount of sliding resistance because it makes it easy to designate a spot on the map 22a. As such being the case, control is exercised in S5 to energize the coil 58b for the purpose of adjusting the repulsive force exerted between the support portion 50b of the housing 50 and the contact portion 71c of the knob base 71. This causes the manipulation knob 70 to encounter appropriate sliding resistance.

If, in S4 of FIG. 7, the cursor 80 is determined to be positioned over a button 22b (S4: Y) in a situation where the cursor 80 is positioned over the button 22b, processing proceeds to S8. Similarly, if the display screen 22 displays a screen-view that looks like a destination search method selection screen-view in (A) and (B) of FIG. 9, mainly shows buttons 22m-22r only, and is not a map screen-view (S2: N), the cursor position is detected in S7 in the same manner as in S3. Upon completion of S7, processing proceeds to S8.

In S8, current is applied to the coils 41-44 for x- and y-axis direction manipulation reaction force generation in order to give a pull-in force to on-screen buttons in compliance with their positions. More specifically, the current to be applied to the coils 41-44 through the X reaction force adjustment portion 35 and the Y reaction force adjustment portion 37 is adjusted in such a manner that the manipulation knob 70 to which no external force is applied moves to a freely-selected position within its movement range. Energization control exercised with respect to the coils 41-44 to perform the above process is disclosed in JP 2005-141675 A and will not be described in detail here.

If at least a part of the cursor 80 is positioned over a button such as the button 22b (S4: Y), current is therefore applied to the coils 41-44 so as to move the manipulation knob 70 to a position corresponding to the center of that button. This process enables the manipulating person to easily move the cursor 80 to the center of a desired button such as the button 22b. If the cursor 80 whose position is detected in S7 is positioned over no button, the process of S8 is not substantially performed and is skipped.

Next, in S9, current is applied to the coil 58b for repulsive force adjustment in order to adjust the friction force in compliance with the position of an on-screen button. The processing then proceeds to S1. More specifically, when the manipulation knob 70 is placed in a position corresponding to the center of the button 22b, a process is performed to reduce the current applied to the coil 58b in order to decrease the repulsive force and increase the friction force exerted between the support portion 50b and the contact portion 71c. This process inhibits the manipulating person from allowing the cursor 80 to pass through the center of a desired button, such as the button 22b, and enables the manipulating person to easily place the cursor 80 at the center of the desired button. The term "center" is not limited to a single point, but may represent a range having a certain area.

Figure 9:
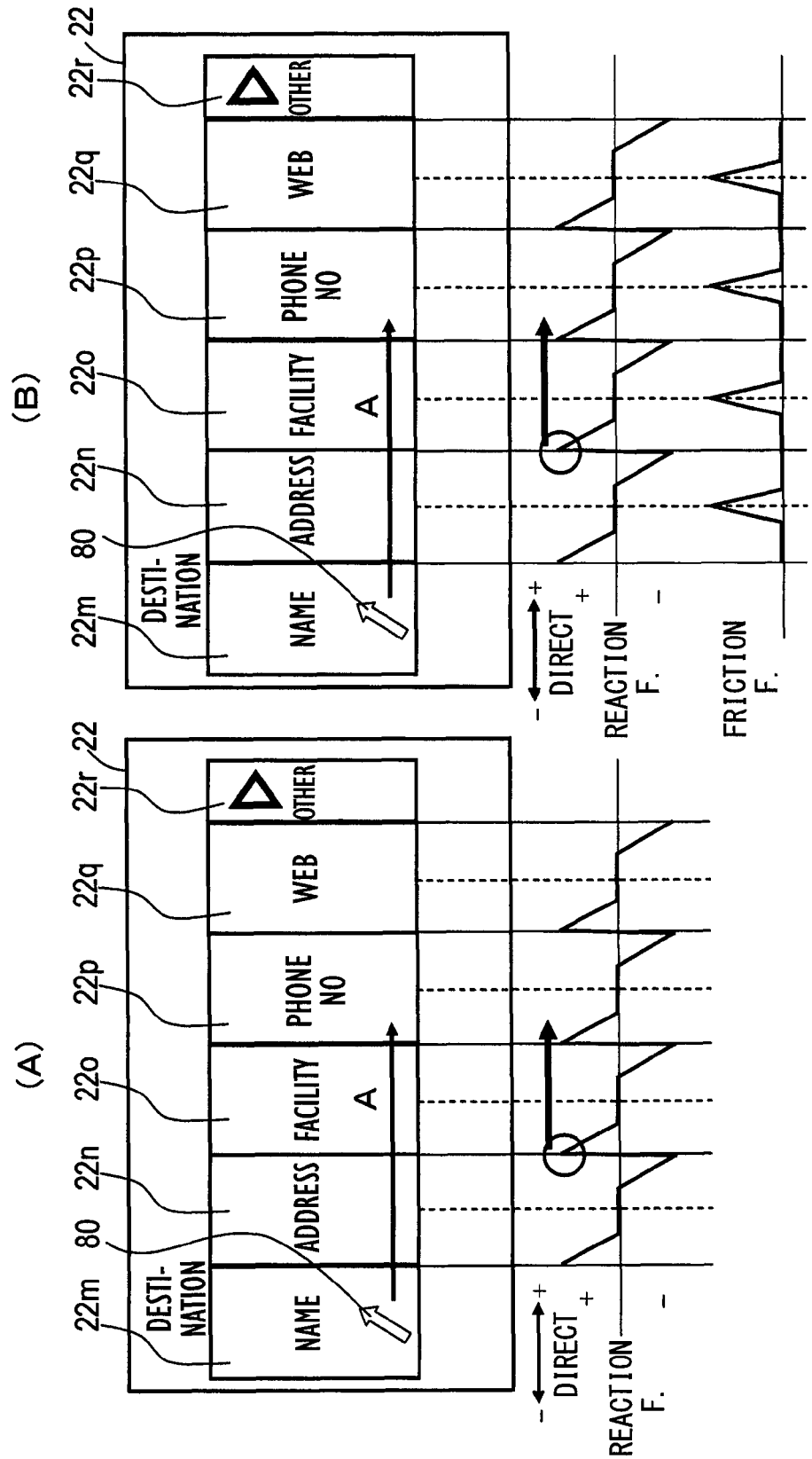
FIG. 9 is a diagram illustrating other examples of a screen-view used in the control process together with their effects.

If the cursor 80 moves in the direction of arrow A when the display screen 22 shows the buttons 22m-22r like a destination search method selection screen-view in (A) of FIG. 9, a reaction force in (A) of FIG. 9 is exerted on the manipulation knob 70. More specifically, when the cursor 80 moves from the button 22*m* to the button 22*n*, the process of S8 is performed to apply a reaction force to the manipulation knob 70 so as to move the manipulation knob 70 to a position corresponding to the center of the button 22*n*. Therefore, the reaction force is exerted in the direction of arrow A immediately after the cursor 80 is moved from the button 22*m* to the button 22*n*, and works as a resistance force that is exerted in a direction opposite to the direction of arrow A when the cursor 80 is about to pass through the center of the button 22*n*.

The above instance facilitates positioning of the cursor 80 at the center of a desired one of the buttons 22*m*-22*r*. However, when the cursor 80 is to be moved between neighboring buttons 22*n*-22*r*, the manipulation knob 70 need be manipulated against the aforementioned resistance force. Therefore, undue force may be applied to perform an erroneous manipulation. When the cursor 80 is to be moved from the button 22*n* to the button 22*o*, the cursor 80 may pass through the button 22*o* and move to the button 22*p*.

The present embodiment performs the process of S9 to exercise control so that the friction force increases at the center of each button 22*m*-22*r* as in (B) of FIG. 9. This facilitates positioning of the cursor 80 at the center of a desired one of the buttons 22*m*-22*r*. Further, when the cursor 80 positioned at the center of a desired button is to be moved, the manipulation knob 70 needs to be moved against the friction force. Therefore, the cursor 80 can be moved only when the manipulating person moves the manipulation knob 70 with a definite intention. In S9, if the cursor 80 is not positioned at the center of a button, such as the button 22*b*, the repulsive force is applied to reduce the friction force.

[Advantages and Modifications of Present Embodiment]

As described, the present embodiment facilitates manipulation of the manipulation apparatus 100 by exerting a repulsive force between the permanent magnet 78 and the electromagnet 58 in order to reduce the contact pressure and friction force exerted between the support portion 50*b* and the contact portion 71*c*. Since the present embodiment is capable of adjusting the magnitude of the repulsive force by controlling the energization of the coil 58*b*, the manipulation of manipulation apparatus 100 is further facilitated when a manipulation is performed, for instance, to move the cursor 80 to the center of a desired button as mentioned earlier.

In the present embodiment, the manipulation knob 70 corresponds to a manipulation portion; the knob base 71 corresponds to a movable body; the coil-side yoke 56 corresponds to a yoke; the housing 50, the circuit board 52, and the bottom cover 53 correspond to a retaining body; the permanent magnet 78 and the electromagnet 58 correspond to a repulsive force generation portion; the display 21 corresponds to an image display portion; the buttons 22*b*, 22*m*-22*r* correspond to an instruction region; the display screen 22 corresponds to a cursor movement region; and the X reaction force adjustment portion 35 and the Y reaction force adjustment portion 37 correspond to a coil control portion.

The present disclosure is not limited to the foregoing embodiment. The present disclosure covers variously modified embodiments as far as they are within the scope of the present disclosure. For example, control based on a VCM (voice coil motor) formed of the magnets 61-64 and the coils 41-44 is not limited to control in which a manipulation reaction force is applied as described earlier. Various other control schemes may be employed for VCM control. Control may be exercised, for example, to vibrate the manipulation knob 70 when predetermined conditions are established. Further, the electromagnetic force need not always be applied to the manipulation knob 70 in two axis directions, but may alternatively be applied to the manipulation knob 70 in one axis direction. In such an alternative case, one coil may be used while two magnets are used. Conversely, the manipulation knob 70 or other movable body may be movably disposed along a spherical surface so that the magnets and yokes perpendicularly apply the electromagnetic force to the spherical surface.

Moreover, control may be exercised in various ways to adjust the magnitude of the repulsive force. For example, control may be exercised to either apply a predetermined amount of friction force to the map 22*a* or apply a strong friction force to the center of the button 22*b*. Alternatively, control may be exercised without regard to a displayed image so that the repulsive force is applied to reduce the friction force to zero at all times. In such an alternative case, a permanent magnet may be embedded in both the support portion 50*b* and the contact portion 71*c* to generate the repulsive force. The repulsive force may alternatively be generated by using, for example, electrostatic repulsion. The present disclosure is not limited to a technical field in which a displayed image changes in response to the manipulation of a manipulation portion. When the present disclosure is applied to various other fields, the reaction force and the repulsive force may be controlled in a wide variety of ways.

However, when the image display portion (21), which displays an image based on the position of the movable body, and the repulsive force adjustment portion (39), which adjusts the magnitude of the repulsive force generated by the repulsive force generation portion in compliance with a screen-view displayed on the image display portion, are incorporated as described in conjunction with the foregoing embodiment, a more evident effect will be obtained. In such an instance, when the image display portion displays the map (22*a*) and the cursor (80), which is displayed over the map (22*a*) and placed at a position corresponding to the position of the movable body, the repulsive force adjustment portion may adjust the magnitude of the repulsive force so as to provide a predetermined amount of sliding resistance to the movable body. This facilitates designating of a point on the map.

Further, in the above instance, when the image display portion displays the instruction region (22*b*, 22*m*-22*r*) for inputting an instruction, the cursor movement region (22) containing the instruction region and larger than the instruction region, and the cursor (80) placed at a position corresponding to the position of the movable body within the cursor movement region, the repulsive force adjustment portion may adjust the magnitude of the repulsive force in such a manner that at least a greater sliding resistance is offered to the movable body when the cursor is positioned at the center of the instruction region than when the cursor is positioned outside the instruction region. This further facilitates the manipulation performed to position the cursor at the center of a desired instruction region.

In the above case, as described in conjunction with the foregoing embodiment, a coil control portion (35, 37) may be additionally incorporated to provide the coil with a current that applies a Lorentz force to the magnet to move the movable body for the purpose of moving the cursor to the center of the instruction region when the cursor is positioned in the instruction region. This further facilitates the manipulation performed to position the cursor at the center of a desired instruction region.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A manipulation apparatus comprising:
magnets;
a manipulation portion to which a manipulation force is inputted;
a movable body that retains the manipulation portion and the magnets, the movable body being movable together with the manipulation portion and the magnets;
coils that are spaced from a movement path of the magnets that move due to movement of the movable body;
a yoke that is disposed opposite the magnets with respect to the coils and used to direct magnetic field lines generated by the magnets to the coils;
a retaining body that retains the coils and the yoke, the retaining body supporting the movable body by making contact with the movable body to cause the movable body to face the coils and the yoke retained in the retained body;
a repulsive force generation portion that generates a repulsive force between the movable body and the retaining body;
an image display portion that displays an image that indicates a position of the movable body; and
a repulsive force adjustment portion that adjusts a magnitude of the repulsive force generated by the repulsive force generation portion based on a screen-view that is displayed by the image display portion,
wherein
when the image display portion displays a map, an entering button on the map, and a cursor that is displayed over the map, the cursor being placed at a position corresponding to a position of the movable body,
the repulsive force adjustment portion
performs a determination as to whether the cursor is on the entering button, and
adjusts a magnitude of the repulsive force to provide a predetermined amount of sliding resistance to the movable body in response to the determination that the cursor is not on the entering button.

2. The manipulation apparatus according to claim 1, wherein
the repulsive force generation portion is a magnet that is provided to each of the movable body and the retaining body.

3. The manipulation apparatus according to claim 2, wherein
at least either the magnet to the movable body or the magnet to the retaining body is an electromagnet.

4. The manipulation apparatus according to claim 1, wherein
the repulsive force adjustment portion applies a current to the coils to move the manipulation portion to a position corresponding to a center of the entering button, when at least a part of the cursor is positioned over the entering button.

5. A manipulation apparatus comprising:
magnets; and
a manipulation portion to which a manipulation force is inputted;
a movable body that retains the manipulation portion and the magnets, the movable body being movable together with the manipulation portion and the magnets;
coils that are spaced from a movement path of the magnets that move due to movement of the movable body;
a yoke that is disposed opposite the magnets with respect to the coils and used to direct magnetic field lines generated by the magnets to the coils;
a retaining body that retains the coils and the yoke, the retaining body supporting the movable body by making contact with the movable body to cause the movable body to face the coils and the yoke retained in the retained body;
a repulsive force generation portion that generates a repulsive force between the movable body and the retaining body;
an image display portion that displays an image that indicates a position of the movable body; and
a repulsive force adjustment portion that adjusts a magnitude of the repulsive force generated by the repulsive force generation portion based on a screen-view that is displayed by the image display portion,
wherein
when the image display portion displays
an instruction region used to input an instruction,
a cursor movement region containing the instruction region and larger than the instruction region, and
the cursor placed at a position corresponding to the position of the movable body within the cursor movement region,
the repulsive force adjustment portion adjusts the magnitude of the repulsive force to produce a greater sliding resistance to the movable body at least when the cursor is positioned at a center of the instruction region than when the cursor is positioned outside the instruction region.

6. The manipulation apparatus according to claim 5, further comprising:
a coil control portion that provides the coils with a current that applies a Lorentz force to the magnets when the cursor is positioned in the instruction region, causing the movable body to move to permit the cursor to move to the center of the instruction region.

7. The manipulation apparatus according to claim 5, wherein
the repulsive force generation portion is a magnet that is provided to each of the movable body and the retaining body.

8. The manipulation apparatus according to claim 7, wherein
at least either the magnet to the movable body or the magnet to the retaining body is an electromagnet.

9. A manipulation apparatus comprising:
magnets;
a manipulation portion configured to receive a manipulation force;

a movable body configured to retain the manipulation portion and the magnets, the movable body being movable together with the manipulation portion and the magnets;

coils that are spaced from a movement path of the magnets that move due to movement of the movable body;

a yoke that is disposed opposite the magnets with respect to the coils and used to direct magnetic field lines generated by the magnets to the coils;

a retaining body configured to retain the coils and the yoke, the retaining body supporting the movable body by making contact with the movable body to cause the movable body to face the coils and the yoke retained in the retained body;

a repulsive force generation portion configured to generate a repulsive force between the movable body and the retaining body;

an image display portion configured to display an image that indicates a position of the movable body; and a repulsive force adjustment portion configured to adjust a magnitude of the repulsive force generated by the repulsive force generation portion based on a screen-view that is displayed by the image display portion, wherein when the image display portion displays a map, an entering button on the map, and a cursor that is displayed over the map, the cursor being placed at a position corresponding to a position of the movable body, the repulsive force adjustment portion is further configured to perform a determination as to whether the cursor is on the entering button, and adjust a magnitude of the repulsive force to provide a predetermined amount of sliding resistance to the movable body in response to the determination that the cursor is not on the entering button, wherein the repulsive force adjustment portion applies a current to the coils to move the manipulation portion to a position corresponding to a center of the entering button, when at least a part of the cursor is positioned over the entering button.

* * * * *